United States Patent [11] 3,547,375

[72] Inventor Robert E. Mackey
 Torrance, Calif.
[21] Appl. No. 715,268
[22] Filed Mar. 22, 1968
[45] Patented Dec. 15, 1970
[73] Assignee TRW Inc.
 Redondo Beach, Calif.
 a corporation of Ohio

[54] PASSIVE RELEASE MECHANISM FOR SPACE VEHICLES
 5 Claims, 6 Drawing Figs.

[52] U.S. Cl. ................................................. 244/1
[51] Int. Cl. ................................................. B64g 1/10
[50] Field of Search ........................................ 244/1;
 85/5(B); 285/(Inquired); 287/(Inquired);
 279/(Inquired)

[56] References Cited
UNITED STATES PATENTS
3,037,256 6/1962 Chapman ............................ 85/5(B)
3,380,687 4/1968 Wrench et al. ........................ 244/1

Primary Examiner—George E. A. Halvosa
Assistant Examiner—Jeffrey L. Forman
Attorneys—Daniel T. Anderson, William B. Leach and Donald W. Graves ABSTRACT: Pedestals support a releasable object above a space vehicle or platform and ball-lock-type pins releasably engage the object with each pedestal. Separation of the object from the platform is accomplished by sequentially disengaging the pins, withdrawing the pins to a position within their respective pedestals, and moving the pedestals from the supporting position to a second position removed from the object. The platform is thus rendered free from projections which may interfere with the release of the object.

Further, means are provided for the release of the object in the event of a system failure in the passive release mechanism.

PATENTED DEC 15 1970 3,547,375

Robert E. Mackey
INVENTOR.

BY *William B. Leach*

ATTORNEY

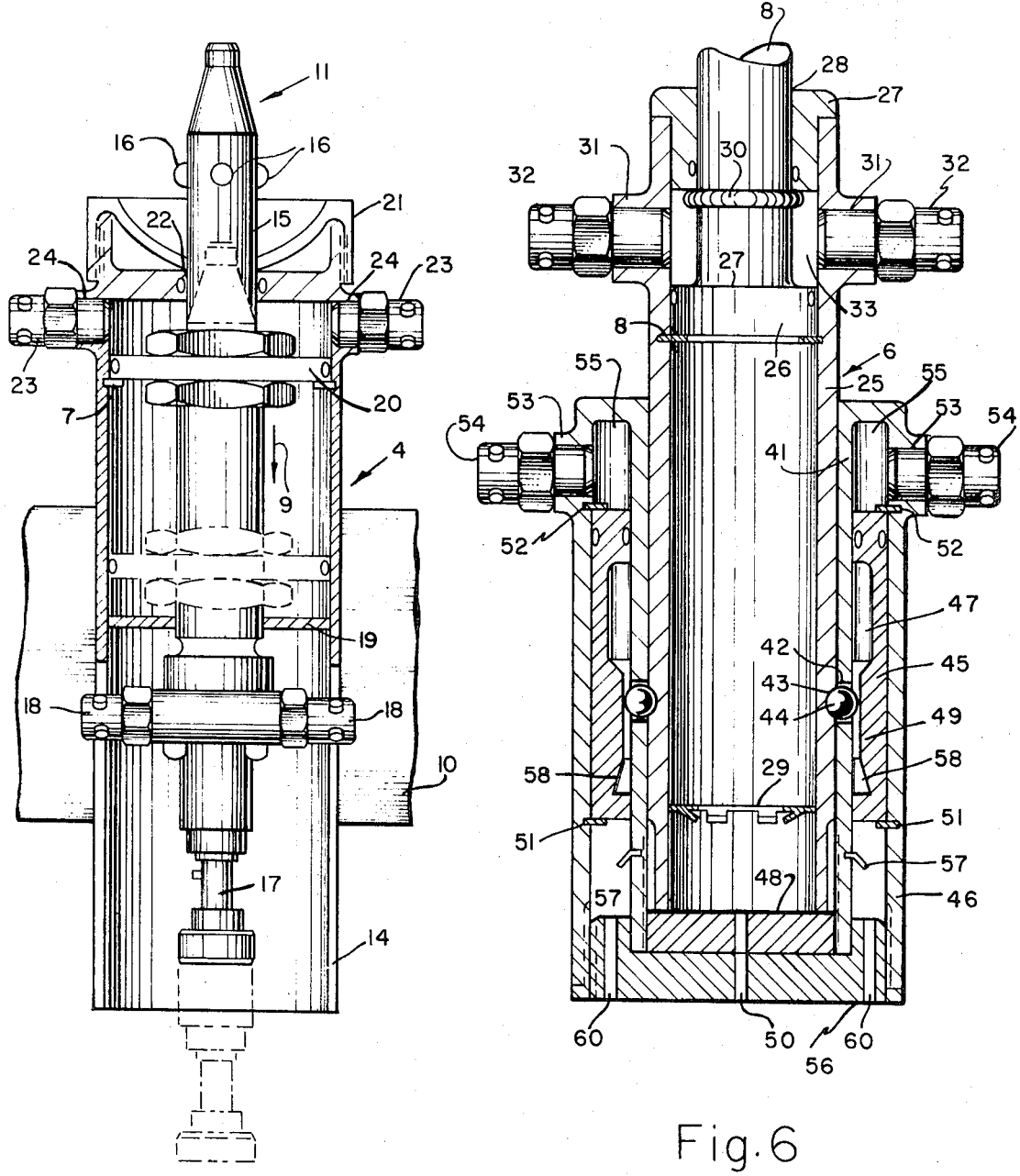

3,547,375

PASSIVE RELEASE MECHANISM FOR SPACE VEHICLES

BACKGROUND OF THE INVENTION

A variety of mechanisms have heretofore been developed for the release of objects such as fuel tanks or bombs from a moving aircraft. Such mechanisms are usually directed toward the active ejection of the object from the aircraft, and the designs thereof necessarily include considerations of aerodynamic loading and stress.

Space exploration programs may require the capability of passively separating or deploying an object from a space vehicle or platform. The object and platform are of course in a zero gravity or low gravity environment when the separation is executed. When releasing objects from a space platform it becomes a matter of concern that the orientation and path of travel of the platform and object are not disturbed by the releasing operation. Thus it is a requirement that the platform and object do not collide with one another following release. It is also desireable that no release ejection velocity be imparted to either the object or the platform.

SUMMARY OF THE INVENTION

In accordance with the present invention an apparatus is provided for executing passive separation of an object from a platform in a low gravity environment. The apparatus includes a pedestal supported by the platform. The pedestal, when in a first position, is adapted to support the object thereon and in a position spaced from the platform. The object is releasably fastened to the pedestal prior to release. Following release of the object from the pedestal, a retraction device moves the pedestal from its first position to a second position spaced from the object. Thus the probability of collision between the object and supporting structure or platform is reduced.

Means are also provided for releasing the object, fastener, pedestal and retraction device from the platform in the event of a passive release system failure.

Accordingly, it is an object of the present invention to provide apparatus for the passive release of an object from a space vehicle or platform.

It is a further object to provide apparatus for supporting an object on a space platform which may be moved away from the object so as to reduce the probability of collision between the object and supporting mechanism or platform following release of the object.

It is another object of the present invention to provide a locking device operable in the event of a passive release system failure which allows releasing of the object and supporting structure.

DESCRIPTION OF THE DRAWINGS

Referring to the accompanying drawings in which like reference characters refer to like elements in the several views:

FIG. 5 is a view in cross section of the pedestal and fastening means in accordance with the present invention; and FIG. 6 is a view in cross section of the retraction means and locking means in accordance with the present invention.

DESCRIPTION OF THE PREFERRED EMBODIMENT

Figure 1:
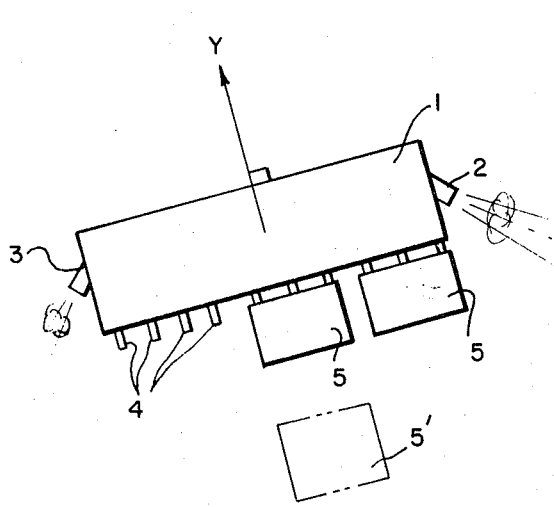
FIG. 1 is a diagram showing the desirable manner of separation of an object from a platform.

Referring again to the drawings, and in particular to FIG. 1, there is shown in diagram form a space platform 1 having rocket engines 2, 3 for the guidance and control of the platform. Associated with the platform 1 are pedestals 4 which releasably support objects 5. Objects 5 may be any desired apparatus which the space program calls for separation in space. Object 5' has been released from pedestal support and platform 1 has been propelled away from object 5'. As shown, platform 1 and object 5' have relative motion in the Y direction only. This is a desirable form of release for the reason that separation may be accomplished without imparting reactive forces to either the object 5' or the platform 1.

Figure 2:
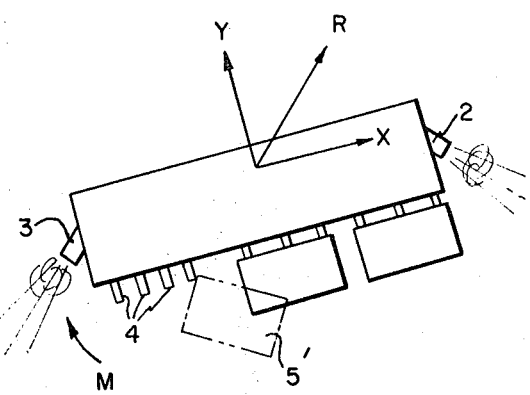
FIG. 2 is a diagram showing an undesirable effect of separation of an object from a platform.

The design of a space system having a velocity component in the Y direction only is highly unlikely due to the tolerances of manufacturing. As shown in FIG. 2, platform 1 may have components of velocity in the Y and X direction, giving a resultant velocity R. Platform 1 may further have a moment of rotation M. In this situation the release of object 5' may result in the collision of object 5' with a portion of the platform 1 or with one of the pedestals 4.

Figure 3:
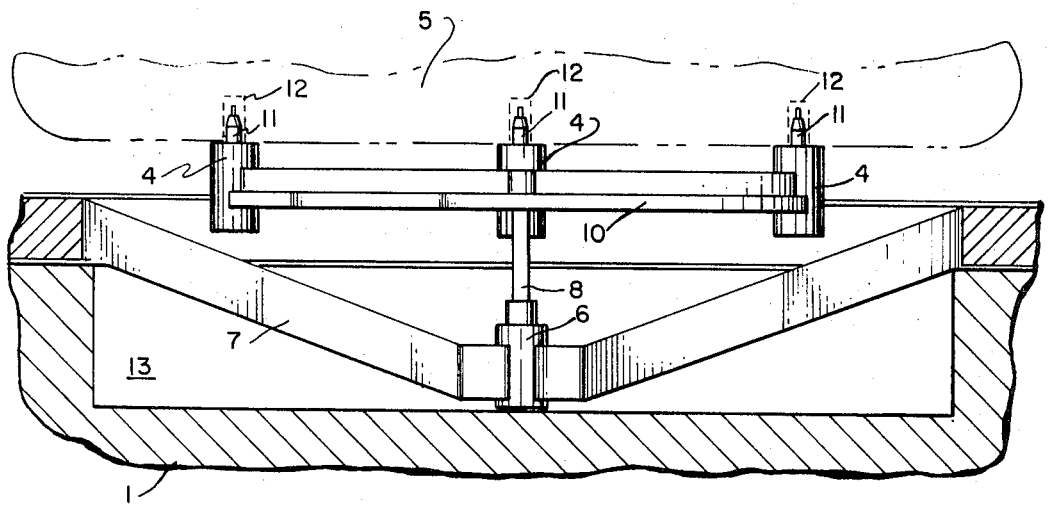
FIG. 3 is a partial view in cross section of an object to be separated from a space platform and a passive release mechanism made in accordance with the present invention.
Figure 4:
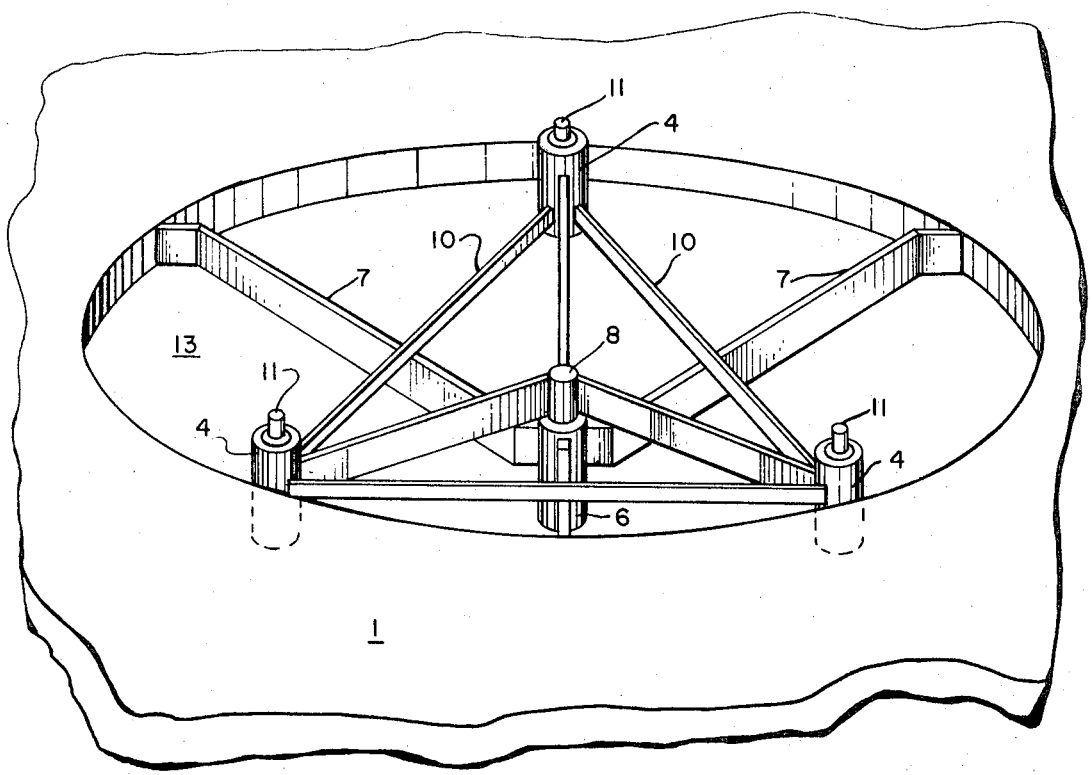
FIG. 4 is a partial view in perspective of the space platform and passive release mechanism of FIG. 3.

The apparatus of the present invention tends to reduce the probability of a collision occurring between an object which has been released and the space platform or pedestal supports. In FIG. 3 an object 5 to be released is shown supported above a portion of the space platform 1. As shown in FIGS. 3 and 4, retraction mechanism 6 is supported by the space platform through supporting structure 7. Piston rod 8 of retraction mechanism 6 is connected to and supports members 10, which in turn support pedestals 4. Ball-lock type mechanism 11 associated with each pedestal 4 slidably engages within socket 12 of object 5 (FIG. 3). Platform 1 has provided therein a cavity 13 within which the retraction mechanism 6 and supporting structure 7 are housed and into which members 10, pedestals 4 and ball-lock pins 11 may be withdrawn by piston rod 8. The platform surface is thereby rendered free from projections which may interfere with the passive release of object 5. Object 5 is left spaced from platform 1 and platform 1 may be propelled away from object 5 without influencing the motion of either object 5 or platform 1.

In FIG. 5 a ball-lock pin 11 is shown in association with pedestal 4. Ball-lock pin 11 is of a type which is commercially available and has been adapted to be slidably mounted within cylindrical housing 14 of pedestal 4.

Ball-lock pin 11 includes an elongated body 15 having an axially aligned cylindrical passageway therein. Ball bearings 16 are mounted near one end of body 15 and the ball bearing seat of body 15 communicates with the interior passageway. Ball-lock pin 11 further includes an actuator piston 17 slidably mounted within the interior passageway of body 15. In operation, the movement of piston 17 in one direction allows ball bearings 16 to recess within body 15 allowing the insertion and withdrawal of body 15 into a socket. Movement of piston 17 in the other direction extends bearings 16 for engagement with the socket. Ball-lock pin 11 is further provided with gas cartridges 18, 18 which communicate with the interior of the passageway of body 15 and with actuator piston 17 for hydraulically moving actuator piston 17. The hydraulic medium may be either a gas or a liquid.

The commercially available ball-lock pin 11 has been modified by the addition of piston 20 mounted on body 15 of pin 11. Piston 20 is adapted for slidably mounting within cylindrical housing 14 of pedestal 4.

Pedestal 4 includes a cap 21 for closing one end of housing 14. Cap 21 has an opening 22 formed therein for receiving body 15 of pin 11. A guide member 19 having an aperture therein for slidably receiving body 15 is provided to insure axial movement of body 15. Gas cartridges 23, 23 are threadably mounted in ports 24, 24 of housing 14. Ports 24, 24 communicate with the interior of housing 14 intermediate cap 21 and piston 20. Gas cartridges 23, 23 may be actuated by an electrical signal and hydraulic pressure generated by cartridges 23, 23 drives piston 20 in the direction of arrow 9. This movement of piston 20 withdraws pin 11 to within housing 14 of pedestal 4 shown in dash lines).

Prior to release, object 5 is seatably mounted on cap 21 of pedestal 4 and is secured by the interference of ball bearings 16 within the socket 12 of object 5 (FIG. 3). To execute release, gas cartridges 18, 18 are electrically actuated to activate actuator piston 17, thereby recessing ball bearings 16 and relieving the interference. Thereafter gas cartridges 23, 23 are actuated for the purposes of building up gas pressure on piston 20 which will cause retainer ring 7 to yield, thus withdrawing pin 11 to a position within pedestal 4. The time lapse between the actuation of gas cartridges 18, 18 and gas cartridges 23, 23 is preferably on the order of milliseconds. At this point of time the object 5 is merely resting upon pedestal 4 and in order to free the platform surface of projections it remains to withdraw pedestal 4 to a point within cavity 13 of platform 1.

In FIG. 6 there is shown retracting means 6 for the movement of pedestal 4 from a first position to a second position. Retracting means 6 includes a retraction cylinder 25, within which piston 26 is slidably mounted. Connected to piston 26 is one end 27 of piston rod 8. As was shown in FIGS. 3 and 4, piston rod 8 is connected structurally to each of the pedestals 4. Retraction mechanism 6 further includes an end cap 27 having an opening 28 therethrough for slidably receiving piston rod 8. A collar 30 formed on piston rod 8 limits the movement of rod 8 and piston 26 in a direction toward cap 27. Retainer ring 8 serves to limit the movement of piston 26 in a direction away from cap 27. Ports 31, 31 formed in the wall of cylinder 25 communicate with the interior of cylinder 25 at a point intermediate cap 27 and piston 26. Gas cartridges 32, 32 are threadably mounted in ports 31, 31 for the purposes of supplying hydraulic pressure to the space 33 intermediate cap 27 and piston 26 for causing retainer ring 8 to yield and for driving piston 26 away from cap 27. Closure cap 48 limits the movement of retracting piston 26. Piston catcher spring 29 serves to engage piston 26 and retain piston 26 against cap 48. And cap 48 has a vent passage 50 for relief of gas pressure in the path of piston 26. By this action piston rod 8 withdraws pedestals 4 to a second position away from object 5.

By the action of the above described apparatus, the surface of the platform 1 adjacent the object 5 is rendered free from projections with which the object may collide following release. The object is therefore free to float away from the space vehicle or the space vehicle may be propelled away from the object. In either case the release of the object from the space vehicle is passively accomplished.

The reliable accomplishment of any space objective is of prime concern in any space program. In some cases several objects may be required to be sequentially separated or deployed from the spacecraft. In some cases the failure to separate one of the objects in the sequence may abort the separation of other objects. To insure the accomplishment of object and platform separation of any given object, a locking device is provided. The purpose of this locking device is to release the object, fastening means, and pedestals from the spacecraft in the event that the aforedescribed passive release mechanism fails, or in the event that a sequence signal is not received by cartridges 23, 18 or 32.

The locking means includes a double wall cylindrical housing having an inner cylinder 41 and an outer cylinder 46. Closure cap 48 is threadably connected to inner cylinder 41 to limit the movement of retraction piston 26 as described. A bottom plate 50 is threadably mounted to outer cylinder 46. Retraction cylinder 25 is slidably received within inner cylinder 41 and in nominally bottomed against closure cap 48. Outer cylinder 46 is supported by platform 1 through supporting members 7 (FIGS. 3 and 4).

The locking means nominally interlocks the retracting means 6 to the platform 1. Openings 42, 42 are formed in the walls of inner cylinder 41. Ball bearing seats 43, 43 in cylinder 25 are aligned with and facing openings 42, 42 so that ball bearings 44, 44 may engage seats 43, 43. A ring-shaped bias member 45 is slidably received intermediate inner cylinder 41 and outer cylinder 46. The inner surface of member 45 has a recessed portion 47 and a lobe portion 49. When bias member 45 is positioned as shown, lobe portion 49 urges bearings 44, 44 into seating engagement with seats 43, 43. Retainer rings 51, 52 secure member 45 in this nominal position. Thus, retracting means 6 is interlocked to the platform 1 through the locking means.

In the event of a system failure which renders the passive release system inoperable, the locking action of ball bearings 44, 44 may be released. Outer cylinder 46 has ports 53, 53 in which are mounted gas cartridges 54, 54. Gasses injected into chamber 55 act against member 45 to rupture retaining ring 51 and drive member 45 toward bottom plate 56. Plate 56 has vent passages 60, 60 for relief of gas pressure in the path of member 45. Bias member catcher ring 57 serves to retain member 45 against bottom plate 56 by engaging slot 58 of member 45. This movement of member 45 positions recessed portion 47 adjacent ball bearings 44, 44, allowing bearings 44, 44 to unseat and free retraction cylinder 25 from interlocking restraint. Thus, retraction cylinder 25 is free to slide outwardly of inner cylinder 41. Retraction cylinder 25 will carry with it object 5, ball-lock pins 11, pedestals 4, and retraction means 6. The object 5 and platform 1 are thereby separable even though a release system failure occurs.

By the means described, the present invention provides for the passive separation of an object from a space vehicle or platform. The invention further provides for the release of the object even though a passive release system failure occurs.

I claim:

1. An apparatus for passively separating an object from a platform in a low-gravity environment, comprising:
   a. a pedestal movable from a first to a second position, the object being seatable upon said pedestal and spaced form the platform when the pedestal is in said first position and said pedestal being spaced from the object when said pedestal is in said second position;
   b. fastener means associated with said pedestal for releasably holding the object in seated arrangement upon said pedestal when said pedestal is in said first position;
   c. retraction means connected to the platform and operably connected to said pedestal for moving said pedestal from said first position to said second position;
   d. arresting means associated with said retraction means for terminating the movement of said retraction means at a position corresponding to said second position of said pedestal; and
   e. retaining means associated with said retraction means for prohibiting movement thereof from the arrested position whereby there is a reduced probability of imparting reactive forces to the object upon separation of the object from the platform.

2. The apparatus of claim 1 wherein said retraction means comprises:
   a cylinder having an end wall, said end wall having an opening formed therethrough, and said cylinder being connected to the platform;
   a piston slidably mounted within said cylinder;
   a piston rod connected at one end thereof to said piston, said rod being slidably mounted in said opening of said end wall, and the other end thereof being connected to said pedestal; and
   hydraulic means communicating with the interior of said cylinder intermediate said piston and said end wall whereby hydraulic fluid may be injected for driving said piston away from said end wall, thereby retracting said pedestal from said first position to said second position.

3. An apparatus for passively separating an object from a platform in a low-gravity environment comprising:
   a. a pedestal movable from a first to a second position, the object being seatable upon said pedestal and spaced from the platform when the pedestal is in said first position, and said pedestal being spaced from the object when said pedestal is in said second position;
   b. fastener means associated with said pedestal for releasably holding the object in seated arrangement upon said pedestal when said pedestal is in said first position;

c. retraction means connected to the platform and operably connected to said pedestal for moving said pedestal from said first position to said second position; and d. locking means disposed intermediate and operably connected to said retraction means and the platform for releasably connecting said retraction means to the platform whereby the object may be released from the platform by the actuation of said locking means or by the actuation of said pedestal, fastener means, and said retraction means.

4. The apparatus of claim 3 wherein said locking means comprises:

a guide tube adapted to slidably receive said retracting means therein, said guide tube being connected to said platform and said retracting means being slidably mounted in said tube;

latch means associated with said guide tube and said retracting means for releasably holding said retracting means in said guide tube; and bias means for releasably urging said latch means toward said retracting means and into holding relationship therewith, said bias means being operably connected to said guide tube and said latch means.

5. The apparatus of claim 4 wherein said guide tube has an opening formed through a wall thereof, said opening being adjacent to and facing a portion of said retracting means when said retracting means and locking means are in connected relationship, and wherein:

said retracting means has a ball bearing seat formed in said portion; and said latch means comprises a ball bearing being disposed in said opening.